United States Patent [19]

Beer et al.

[11] Patent Number: 4,805,064

[45] Date of Patent: Feb. 14, 1989

[54] LIGHTNING ARRESTER HAVING A HOUSING WITH A HIGH FILLER CONTENT

[75] Inventors: Hans-Rudolf Beer, Binz; Helmut Britsch, Schinznach; Tony Kaiser, Buchs; Günther Maier, Wettingen; Alois Muff, Sursee, all of Switzerland

[73] Assignee: BBC Brown, Boveri & Company, Ltd., Baden, Switzerland

[21] Appl. No.: 898,339

[22] Filed: Aug. 20, 1986

[30] Foreign Application Priority Data

Sep. 2, 1985 [CH] Switzerland ........................ 3774/85

[51] Int. Cl.$^4$ .............................................. H02H 9/04

[52] U.S. Cl. .................................. 361/117; 361/126; 338/21

[58] Field of Search ............... 361/117, 118, 126, 127, 361/128, 129, 130; 313/258, 259, 269, 256, 231.11; 315/36; 174/116, 179; 338/21

[56] References Cited

U.S. PATENT DOCUMENTS

| | | | |
|---|---|---|---|
| 1,922,221 | 8/1933 | Steenbeck et al. | 361/126 X |
| 2,150,167 | 3/1939 | Hutchins et al. | 361/126 X |
| 4,092,694 | 5/1972 | Stetson | 361/126 |
| 4,404,614 | 9/1983 | Koch et al. | 361/126 X |
| 4,658,324 | 4/1987 | Inaba | 361/118 |

FOREIGN PATENT DOCUMENTS

| | | | |
|---|---|---|---|
| 0004349 | 3/1983 | European Pat. Off. . | |
| 0147607 | 7/1985 | European Pat. Off. . | |
| 179571 | 12/1934 | Fed. Rep. of Germany | 361/126 |
| 2394874 | 1/1979 | France . | |
| 2441907 | 6/1980 | France . | |
| 542520 | 1/1942 | United Kingdom | 361/126 |
| 553461 | 5/1943 | United Kingdom | 361/126 |
| 1111436 | 4/1968 | United Kingdom . | |

*Primary Examiner*—A. D. Pellinen
*Assistant Examiner*—A. Jonathan Wysocki
*Attorney, Agent, or Firm*—Burns, Doane, Swecker & Mathis

[57] ABSTRACT

A lightning arrester having two terminal fittings (3), at least one resistor core (1) which contacts with the latter and which is of voltage-dependent resistance material, and an insulating housing (5) closely surrounding the resistor core (1). A lightning arrester of the generic type is to be created which can be manufactured with relatively low energy expenditure, without additional assembly effort and by a simple process. This is achieved by the housing (5) consisting of a resin matrix with embedded filler, the filler making up over 80% by weight of the housing, and by the housing (5) surrounding at least one resistor core (1) and the region of the terminal fittings (3) contacting the latter. The housing (5) is produced by the setting of a cast moulding compound.

5 Claims, 1 Drawing Sheet

LIGHTNING ARRESTER HAVING A HOUSING WITH A HIGH FILLER CONTENT

FIELD OF THE INVENTION

The present invention relates to a lightning arrester and a process for its manufacture.

BACKGROUND OF THE INVENTION

A lightning arrester is already known from European Patent Specification 0,004,349, in which a resistor core of voltage-dependent resistance material is closely surrounded by a housing. This housing consists of a moulding compound of porcelain which has been sintered together with the resistor core only just below the sintering temperature of the latter. The sintering temperature was above 1000° C.; it can only be reached with high energy expenditure. The terminal fittings are attached after the sintering operation by means of an elaborate adhesion and screwing operation, a further seal having to be installed which protects the terminal zone of the resistor core against any contamination.

OBJECTS AND SUMMARY OF THE INVENTION

This is where the invention is intended to provide a remedy. It is an object of the invention to create a lightning arrester of the generic type which can be manufactured with low energy expenditure, without additional assembly effort for the placement of the terminal fittings and without additional seal installation, and to specify a simple process for its manufacture.

An advantage of the invention is to be seen in the fact that a mass production of lightning arresters is possible in a simple way. The lightning arrester is of one piece and can be designated easily such that it can also be used as a post insulator. Furthermore, it also has an advantageous effect on the energy consumption that the setting of the moulding compound can take place at comparatively low temperatures.

The further developments of the invention are subject-matters of the dependent claims.

BRIEF DESCRIPTION OF THE DRAWINGS

The invention is explained in more detail below with reference to drawings representing just one way of carrying out the invention, in which.

In both figures, parts acting in the same way are provided with the same reference symbols.

DETAILED DESCRIPTION OF THE PREFERRED EMBODIMENT

Figure 1:
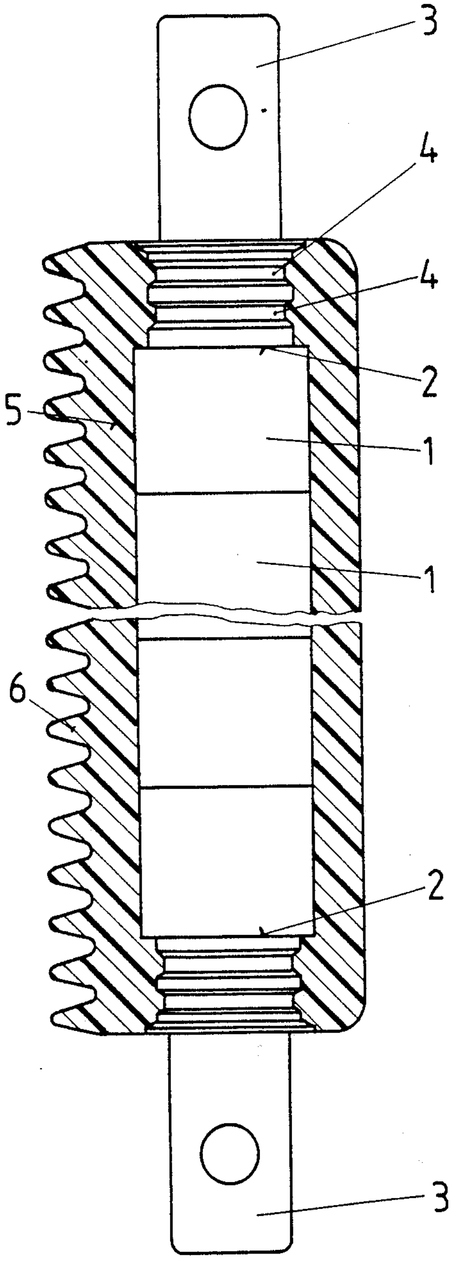
FIG. 1 is a sectional view of an embodiment of the lightning arrester according to the invention.

FIG. 1 shows a lightning arrester composed of several cylindrical resistor cores 1, contacted with one another at the respective faces. The resistor cores 1 consist of voltage-dependent resistance material. On each of the two faces 2 of the stack of resistor cores 1 rests a terminal fitting 3 of metal. These terminal fittings 3 have groove-like indentations 4. The groove-like indentations 4 do not have to be angular, as they are shown; their contours may also be well rounded to avoid with certainty any notch effects. Furthermore, flattened portions may be provided in this region which prevent a twisting of the terminal fitting 3. An insulating housing 5 closely surrounds the stack of resistor cores 1 and the respective contacting region between the terminal fittings 3 and the faces 2.

The housing 5 consists of a set resin matrix into which electrically insulating inorganic filler is embedded. The proportion of filler in the housing 5 is more than 80% by weight. The housing 5 may, as shown on the left-hand side, be provided with ribs 6 for outdoor application. For indoor conditions, the design without ribs is sufficient, as is shown on the right-hand side.

The insulating filler predominantly consists of commercially available granulated synthetic silica. The filler additionally contains a quantity of bead substance, the majority of which has a smaller particle size than the smallest particles of the granulated synthetic silica. The bead substance is made of E-glass glass. In the filler, the ratio between granules of synthetic silica and the bead substance of E-glass in % by weight is virtually 2:1.

The terminal fittings 3 are advantageously made of steel. The co-efficients of expansion of the terminal fittings 3, of the resistor cores 1 and of the housing 5 are then matched in such a way that no crack formation can occur in the housing 5 when there is operationally occasioned heating of the lightning arrester. Furthermore, no detachment effects can occur between the housing 5 and the resistor cores 1 or else between the housing 5 and the terminal fittings 3. Similarly, the contact force necessary between the terminal fittings 3 and the faces 2 of the resistor cores 1 is constantly maintained via the housing 5. The adhesion between the terminal fittings 3 and the housing 5 is improved by these groove-like indentations 4, which, in addition, increase the absorption capacity of the housing 5 for axial forces.

Figure 2:
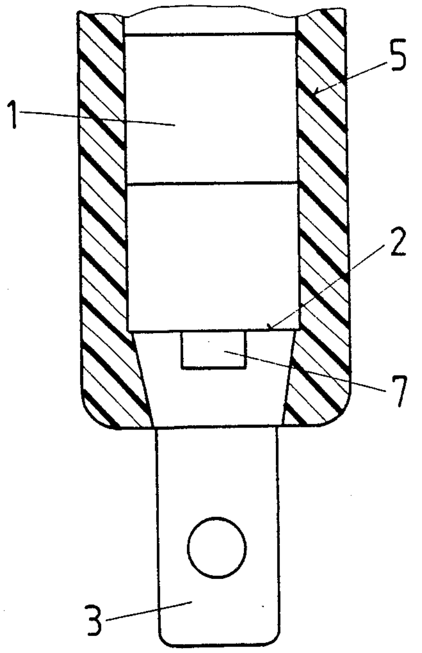
FIG. 2 is a partial sectional view of a further possibility of designing its terminal portion.

FIG. 2 shows a terminal portion of a lightning arrester for indoor use, in which the terminal fitting 3 is designed cone-like. The shape of the terminal fitting 3 ensures a particularly good transfer of the axial forces from housing 5 to the resistor cores 1. A flattened portion 7 on the terminal fitting 3 is intended as a twist safeguard; several flattened portions may also be provided.

In the manufacture of this lightning arrester, the stack of resistor cores 1 is encapsulated by a moulded compound together with the contacting region of the terminal fittings 3 contacting this stack at the faces 2. This moulding compound is mixed from the filler and casting resin in a ratio of at least 4:1 percent by weight.

The filler consists predominantly of granules which contain the particles of various sizes in various fractions. Furthermore, the filler contains a quantity of bead substance in which likewise particles of various sizes are contained in various functions. The size ranges of the particles of the various fractions of the filler overlap. In particular, the largest particles of the fraction with the largest beads are larger than the smallest particles of the fraction with the smallest granule particles. However, the majority of the bead substance has a smaller particle size than the smallest granule particles. In the exemplary embodiment, the granules consist of three fractions of synthetic silica, the average particle sizes of these three fractions being approximately in the relation 1:2:2.5. The quantity of bead substance consists of two fractions of E-glass beads, the average particle sizes of which are approximately in the relation 1:4.5. It is advantageous for the mechanical strength of the housing if the E-glass bead substance is coated with a coupling agent.

The filler components are mixed with the filler, heated and pre-dried before the mixing of the casting resin. During the mixing of the moulding compound from casting resin and filler, this compound is already deaerated.

The casting resin used for the moulding compound may originate from one of the following four groups: anhydride-cured epoxy resins, unsaturated polyester resins, acryl resins and polyurethane resins. Unsaturated polyester resins and acryl resins can be used to particular advantage here as these resins set quickly without additional heat supply.

The terminal fittings 3 and the resistor cores 1 are placed in a casting mould and mechanically pre-tensioned with respect to one another, for example by means of springs, to ensure a good and reliable contacting among one another. Furthermore, this mechanical pre-tensioning means that, during the subsequent casting with the moulding compound, no gaps occur between the resistor cores 1 themselves and between the resistor cores 1 and the terminal fittings 3, into which the moulding compound could flow. For the operation of encapsulating, the casting mould is introduced, with vertically positioned longitudinal axis, into a vacuum chamber. The negative pressure in this chamber enhances the flowing of the moulding compound into the casting mould. In addition, the casting mould is subjected to mechanical vibrations which on the one hand enhance the flowing-in of the moulding compound and on the other hand ensure the filling-out of all cavities of the casting mould.

In the exemplary embodiment, the moulding compound is mixed from the following constituents in % by weight: 6.5% epoxy resin, 6.5% hardener, 0.01% accelerator, 26.7% synthetic silica with a particle size of 0.355 to 2 mm, 17.4% synthetic silica with a particle size of 0.25 to 0.71 mm, 13.4% synthetic silica with a particle size of 0.125 to 0.355 mm, 4.4% E-glass bead substance with a particle size of 0.075 to 0.15 mm, and 26.1% of E-glass bead substance with a particle size of 0 to 0.05 mm. In this operation, initially the filling components are mixed, heated to 120° C. to 140° C. and pre-dried. During the mixing of the moulding compound from the heated filler, the epoxy resin, the hardener and the accelerator for the curing operation, it is deaerated for at least ten minutes. The negative pressure in the vacuum chamber is 600 to 1000 Pascal, and the mechanical vibrations acting there on the casting mould are in a frequency range of 100 to 200 Hz and have amplitudes in the range from 0.1 to 1 mm.

After the filling of the casting mould with the moulding compound, the casting mould is removed from the vacuum chamber and introduced into a furnace. The setting operation of the moulding compound then takes place for about 20 hours at changing temperatures in the range from 80° C. to 140° C. After the conclusion of this operation the housing 5 is produced from the moulding compound and, after opening of the casting mould, holds together the lightning arrester.

It is, furthermore, conceivable to use such a moulding compound in the manufacture of further electricity devices as well, such as for example in the case of measuring transducers, coil arrangements for inductors and transformers, support, pin and strain insulators, switch gear and measuring instruments; possible uses in electrical machine construction are also conceivable.

While this invention has been illustrated and described in accordance with a preferred embodiment, it is recognized that variations and changes may be made therein without departing from the invention as set forth in the claims.

What is claimed is:

1. A lightning arrester comprising two terminal fittings; at least one resistor core contacting the terminal fittings and made of voltage-dependent resistance material; and an electrically insulating housing closely surrounding the resistor core said housing being formed of a set resin matrix into which insulating, inorganic filler is embedded, said housing being in contact with the terminal fittings; and said housing containing more than 80% by weight of said filler.

2. The lightning arrester according to claim 1, wherein the filler predominantly takes the form of granules, the filler additionally contains a quantity of bead substance, and the majority of the bead substance has a smaller particle size than the smallest particles of the granules.

3. The lightning arrester according to claim 2, wherein the granules are formed by synthetic silica, the bead substance is made of E-glass, and the ratio of granules of synthetic silica to the bead substance of E-glass in percent by weight is virtually 2:1.

4. The lightning arrester according to claim 1, wherein the terminal fittings are made of steel and have at the points of connection with the housing at least one groove-like indentation.

5. A lightning arrester comprising two terminal fittings; at least one resistor core contacting the terminal fittings in a contacting region and made of voltage-dependent resistance material; and an electrically insulating housing having an interior volume filled by the resistor core so that the resistor core is encapsulated by the housing and the terminal fittings, said housing being formed of a set resin matrix into which insulating, inorganic filler is embedded, said housing being in contact with the terminal fittings; and said housing containing more than 80% by weight of said filler.

* * * * *